H. F. STRATTON.
CONTROLLER FOR ELECTRIC MOTORS.
APPLICATION FILED JUNE 20, 1912.
1,080,126.
Patented Dec. 2, 1913.
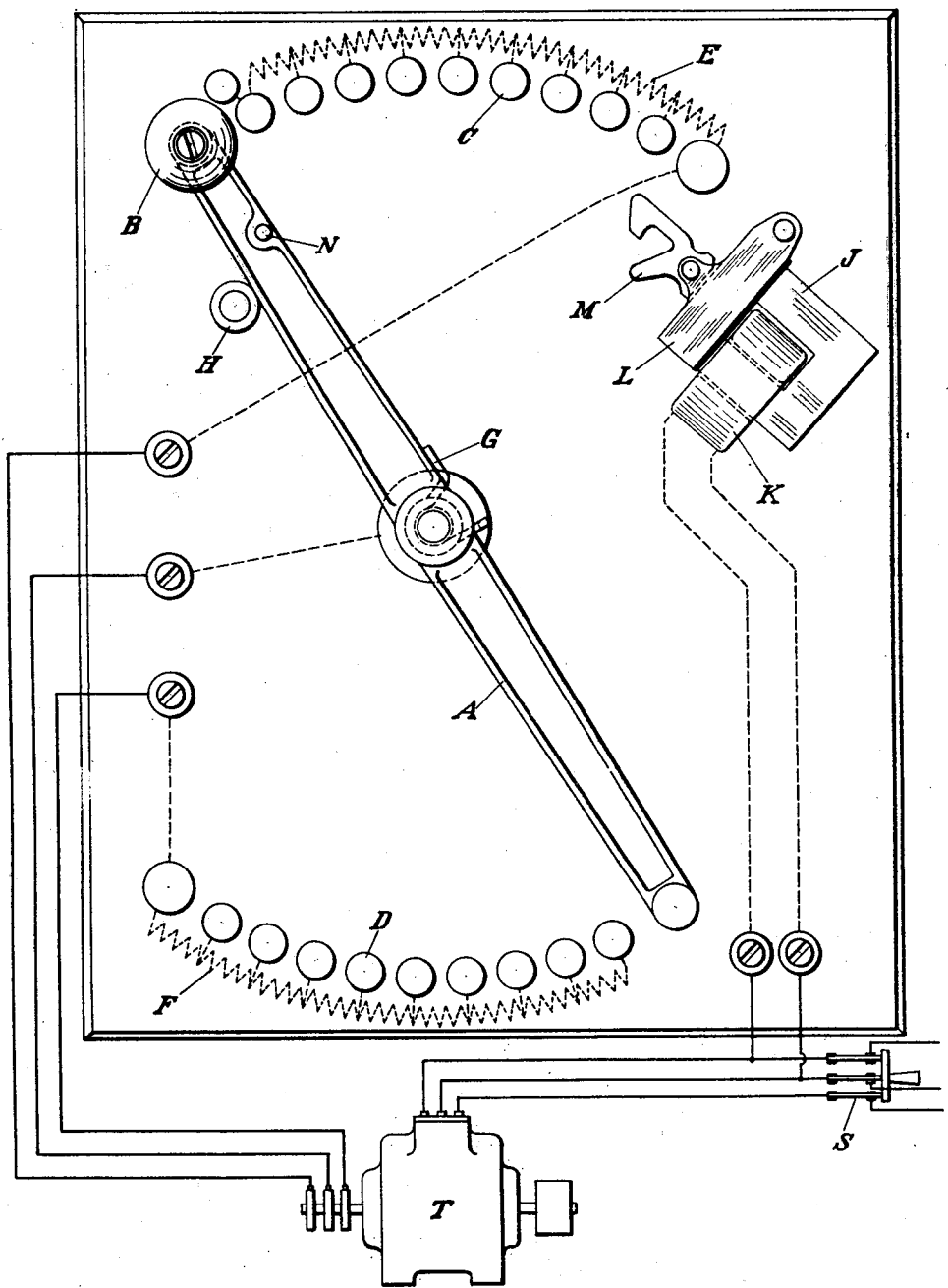
WITNESSES:
INVENTOR.
H. F. Stratton
BY
F. N. Barber
ATTORNEY.

UNITED STATES PATENT OFFICE.

HARRY F. STRATTON, OF CLEVELAND, OHIO, ASSIGNOR TO THE ELECTRIC CONTROLLER AND MANUFACTURING COMPANY, OF CLEVELAND, OHIO, A CORPORATION OF OHIO.

CONTROLLER FOR ELECTRIC MOTORS.

1,080,126. Specification of Letters Patent. Patented Dec. 2, 1913.

Application filed June 20, 1912. Serial No. 704,751.

*To all whom it may concern:*

Be it known that I, HARRY F. STRATTON, a citizen of the United States, residing at Cleveland, in the county of Cuyahoga and State of Ohio, have invented new and useful Improvements in Controllers for Electric Motors, of which the following is a specification.

My invention relates to motor controllers; particularly to controllers for alternating current motors.

In starters and controllers employing a no-voltage release magnet, it sometimes becomes necessary to connect the magnet winding to the primary mains. Upon the occurrence of no voltage, the magnet is deënergized, allowing the controller to return to initial position, the main line switch in the primary remaining closed. When voltage returns to the system the winding of the no-voltage release magnet is at once excited and it may be some minutes before the operator comes to restart the motor or open the line switch. If the armature of the magnet is attached to the movable part of the controller, as in the customary form of direct current controllers, the magnetic circuit of the magnet would remain open as long as the controller is in the initial position.

It is well known that the winding of an alternating current magnet takes more current when its magnetic circuit is open than when it is closed, and a winding designed to remain continuously excited without overheating, with a closed magnetic circuit, may dangerously overheat with the magnetic circuit open.

One of the objects of my invention is to provide a magnet which can be used in connection with alternating current controllers and whose winding always takes a small amount of current regardless of the position of the controlling device.

Other objects will be apparent as set forth in the following description and claims.

Referring to the accompanying drawing, which shows one form of my invention, partially in elevation and partially diagrammatically, the motor T is connected to a suitable source of alternating current by the switch S. The motor is arranged to be started in the usual well-known manner by connecting resistances between the phases of the motor secondary and gradually cutting them out. To accomplish this I make use of a controller comprising the movable arm A, having the handle B and arranged to be moved over the contacts C and D, which are connected to suitable resistances E and F. The arm A is biased to off position, which is the position shown in the drawing, by the spiral spring G, the initial position being determined by the fixed stop H.

To start the motor, the arm A is moved in a clockwise direction, the resistances E and F being gradually cut out until the extreme position is reached. The secondary windings of the motor are short-circuited at this position and the motor operates at full speed.

To hold the arm in the full-speed position against the action of the return spring G, I employ the magnet J, whose winding K is connected to the primary mains. The armature L of the magnet is arranged to remain in contact with the poles of the magnet by the action of gravity, the magnetic circuit will therefore be normally closed, and a minimum reluctance value of the circuit maintained. The winding K will, therefore, take the minimum value of current, in all positions of the controller arm.

The latch M, pivoted to the armature L, engages a pin N, carried by the arm A, as shown in dotted lines, and the arm is held in the full speed position as long as the winding K is energized. Upon a failure of current in the winding K, due to a failure of voltage at the source, or an opening of the circuit of the winding K, the armature L will be swung upwardly by the power of the spring G until the pin N becomes disengaged from the latch M, whereupon the arm A will go to off-position. The armature L immediately returns to its normal position against the poles of the magnet, and upon a return of voltage to its terminals, the winding will, owing to the closed condition of the magnetic circuit, be protected from any increased amount of current.

It will be understood that an overload coil with its winding in the motor circuit can be used to deënergize the winding K in the well-known way. Other arrangements will be obvious to those skilled in the art, without departing from the spirit of my invention, as set forth in the following claims.

I claim—

1. In an electric controller, a controlled circuit, a switch for closing the circuit, an electro-magnet for holding the switch in closed position, the electro-magnet having a winding connected to a source of alternating current and an armature normally in the position of least reluctance for the magnetic circuit, and means releasably connecting the switch to the armature.

2. In a motor system, an alternating current motor, a resistance in the secondary thereof, a movable device for controlling the resistance, an electro-magnet for holding the movable device in a position to connect the least resistance in the said secondary, the magnet having a winding in the primary of the motor and an armature biased to a position of least reluctance in the magnetic circuit of the magnet, and means controlled by the armature for releasably holding the movable device in its said position.

3. In a motor system, an alternating current motor, a variable resistance therefor, a movable device for controlling the resistance, an electro-magnet for holding the movable device in a position to connect less than the entire resistance in the circuit of the motor, the electro-magnet having a winding connected to a source of alternating current and an armature normally in the position of least reluctance for the magnetic circuit of the magnet, and means releasably connecting the movable device to the armature.

Signed at Cleveland, Ohio, this 15th day of June, A. D. 1912.

HARRY F. STRATTON.

Witnesses:
H. M. DIEMER,
P. C. CLARK.